Aug. 27, 1968 J. A. HAY 3,399,200
METHOD OF PRODUCING STARCH PHOSPHATE PRODUCTS CONTINUOUSLY
Filed March 15, 1965
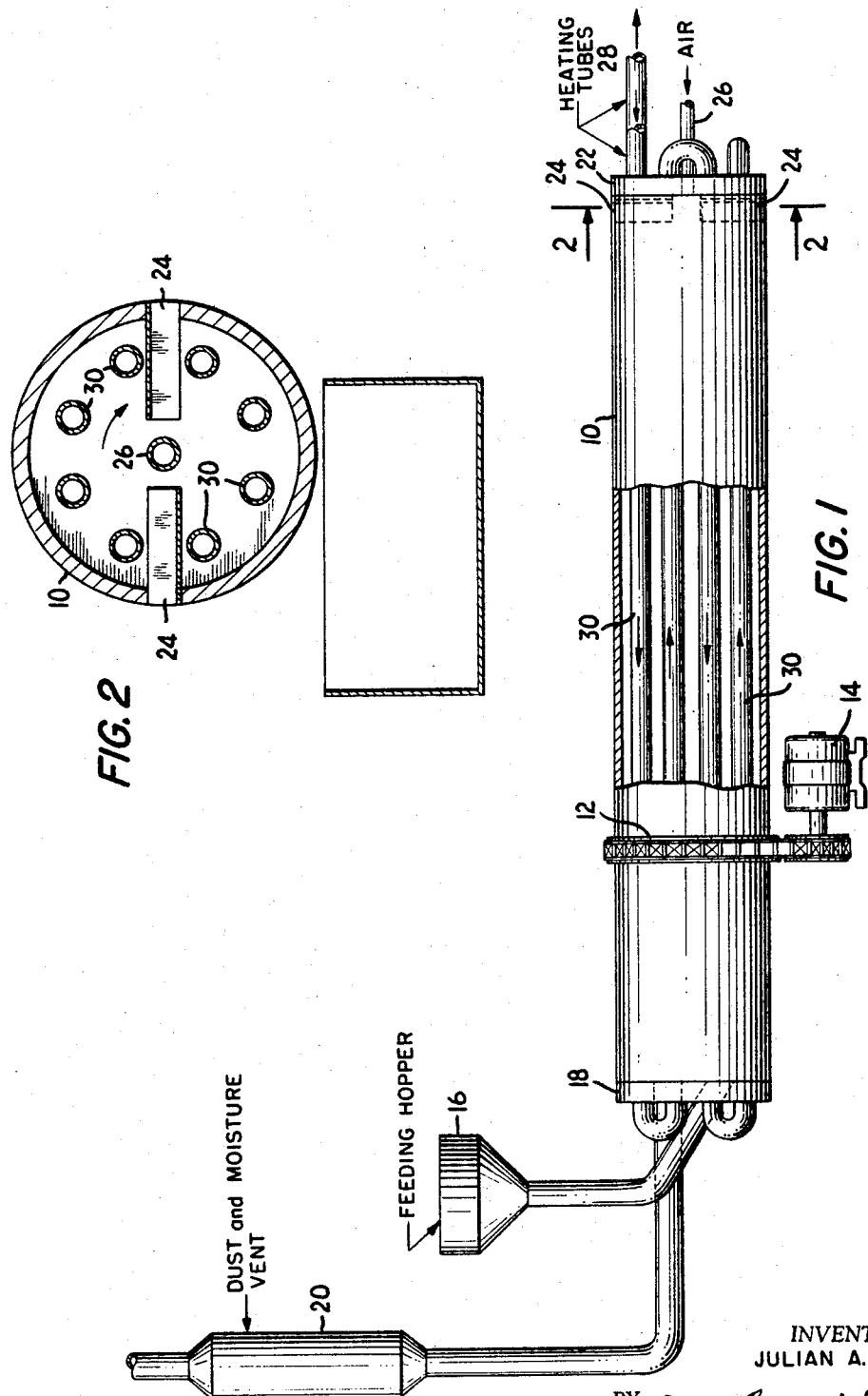
INVENTOR.
JULIAN A. HAY
BY Eyre, Mann & Lucas
ATTORNEYS

United States Patent Office 3,399,200
Patented Aug. 27, 1968

3,399,200
METHOD OF PRODUCING STARCH PHOSPHATE PRODUCTS CONTINUOUSLY
Julian A. Hay, Gary, Ind., assignor to American Maize-Products Company, a corporation of Maine
Filed Mar. 15, 1965, Ser. No. 439,897
7 Claims. (Cl. 260—233.5)

ABSTRACT OF THE DISCLOSURE

Starch granules, free of excess unabsorbed water and containing an absorbed alkali metal phosphate salt, are passed through a phosphorylation zone which is disposed horizontally lengthwise and has a plurality of parallel spaced heated surfaces coextensive with its length. These surfaces are rotated through the granules as they traverse the zone to effect a rapid and uniform reaction between the starch and the phosphate salt.

---

This invention relates to a method of continuously producing starch phosphates comprising the heat reaction product of starch granules and alkali metal phosphate salts absorbed therein.

In U.S. Patent 2,884,412 and others, the preparation of new forms of reaction products of starch and alkali metal phosphate is described. These so-called Neukom starch phosphates are made generally by causing starch granules to absorb aqueous solutions of alkali metal phosphates, then separating the granules from excess unabsorbed solution and then roasting the granules containing the absorbed alkali metal phosphate salt at elevated temperatures to bring about reaction between the starch and phosphate salt. Although there are indications that some form of esterification takes place, the reaction proceeds in a manner not well understood to yield granular starch phosphate products having extremely useful properties as thickeners, stabilizers, binders and viscosity-control agents. Outstanding among such properties is the high viscosity that can be obtained with dilute aqueous solutions of the products, thereby providing a desirably low solids-to-viscosity ratio in end use appplications. For example, 5% aqueous solutions of Neukon starch phosphates prepared by prior art methods may have room temperature viscosities on the order of 30,000 cps.

In accordance with this invention, a new method has been found to produce the aforesaid type of starch phosphate reaction product on a continuous basis and over relatively short reaction times. This results in improved uniformity of characteristics in the final products and also avoids undesirable tendencies for discoloration which has been encountered in conventional production methods.

Briefly described, the novel method of the invention involves the steps of introducing starch granules containing absorbed alkali metal phosphate salt into a zone of phosphorylation, causing the starch granules to tumble into contact with heated surfaces within the zone of phosphorylation, thereby raising the temperature of the starch to reaction temperature of about 120° C. to about 175° C., continuously moving the starch granules through the zone of phosphorylation and collecting the starch phosphate reaction product as it discharges from the zone of phosphorylation. A preferred additional step is to cause a stream of air to pass over the starch granules, in countercurrent flow to direction of travel of the starch granules through the zone of phosphorylation, in order to remove moisture, dust and any gases which may be evolved during reaction from the zone of phosphorylation.

One of the most important steps in the above described method is that of causing the starch particles to tumble into contact with heated surfaces within the zone of phosphorylation. This tumbling movement, which takes place continuously within the zone of phosphorylation and by which the starch granules roll and move over each other, maintains direct contact between a maximum proportion of the total surface area of the starch granules and the heated surfaces positioned in the phosphorylation zone. As a result, a large amount of heat is quickly and uniformly absorbed by the starch granules and the temperature of the granules is rapidly raised to reaction temperatures. Thus, the residence time of each granule in the phosphorylation zone is relatively short, usually not more than about one hour, so that the granules are quickly and uniformly reacted with the alkali metal phosphate salt absorbed therein without excessive coloration or other deterioration as might be the case with more prolonged exposures to the high reaction temperatures. All of these benefits and advantages are of great significance in rendering the above described method a practicable, commercial process by which improved starch phosphate products may be made at high throughput rates.

One preferred apparatus for carrying out the method of the invention is a horizontally positioned rotatable drum into one end of which starch granules containing the absorbed alkali metal phosphate salt are introduced. The drum is provided with heating means which comprises a plurality of tubes which are positioned within the drum in spaced relationship around the interior wall. A heating medium such as steam or high temperature liquids or gases is introduced into these tubes and, as the drum rotates, the starch granules are tumbled into direct contact with the tubes. This heats the starch granules to reaction temperature of about 120° C. to about 175° C. and the phosphorylation reaction will be completed by the time the starch granules reach the opposite end of the drum where they are discharged. A flow of air through the drum, countercurrent to the direction of travel of the starch, removes moisture and dust as well as any gases which may be evolved during reaction.

The starch granules containing absorbed alkali metal phosphate salt for roasting according to this invention may be prepared in conventional manner. As brought out in the previously-mentioned patent, starch granules of any variety are admixed with an aqueous solution of at least one alkali metal phosphate and the resulting mixture is gently agitated at ambient temperature to cause the granules to physically absorb a portion of the phosphate solution without destroying the granular structure of the starch. The concentration of phosphate salt or salts in the solution is varied from 1% to 30% to control the amount of phosphate salt which is absorbed by the granules.

Next, the starch granules are separated from excess, unabsorbed phosphate solution as by decanting or filtration. The granules are then air dried to a moisture content of 20% or less, particularly where they are to be stored rather than immediately roasted at high temperatures to cause reaction between the starch and the absorbed alkali metal phosphate salt.

In carrying out the process of this invention, it is of advantage to prepare the starch granules with absorbed alkali metal phosphate salt in sufficiently large quantity in advance so that a fixed supply thereof may be drawn upon continuously for roasting.

For a further understanding of details of the invention, reference will be made to the accompanying drawings of which:

FIG. 1 is a side elevation of one form of apparatus for roasting starch granules with absorbed alkali metal phosphate salt in accordance with the invention, with portions thereof being in section.

FIG. 2 is a transverse sectional view taken along line 2—2 of FIG. 1.

As shown in FIG. 1, a cylindrical drum 10 is connected for rotation through the chain drive 12 to motor 14. A hopper 16 leads into one end 18 of the drum 10. From the same end 18 extends a vent line 20 through which dust and vapors may exit from within the drum 10. Positioned adjacent the opposite end 22 of the drum 10 is a discharge chute 24. Leading into the end 22 is a pipe 26 through which air may be injected into the drum 10. Also leading into end 22 is a steam line 28 which is connected to the tubes 30 which are positioned parallel to the longitudinal axis of the drum 10 and concentrically around the interior wall thereof (FIG. 2).

The operation and function of the apparatus is as follows. High pressure steam is fed into tubes 30 through the line 28 and preferably dry air is injected into the interior of drum 10, and out through vent line 20 as drum 10 is rotated. Starch granules containing absorbed alkali metal phosphate salt are then introduced into the end 18 of drum 10 from the feed hopper 16. The starch granules are continuously tumbled into contact with the hot tubes 30 as they travel through the drum 10 toward the opposite end 22. This rapidly raises the temperature of the starch granules to about 120° C. to about 175° C. whereby phosphorylation reaction takes place. Any inherent moisture of the starch is volatized and carried away by the dry air moving in countercurrent flow through the starch from line 26 and out through vent line 20. This air stream also removes fine dust and any gases which may be evolved during the reaction. Since the starch granules are continuously being injected into the drum 10 from hopper 16, the granules are forced to gradually move towards the opposite end 22 of the drum 10 until they are discharged through chute 24. The total time of travel through the drum 10 is relatively short, usually not more than one hour, and the starch granules are uniformly reacted with alkali metal phosphate salt absorbed therein by the time they reach the chute 24. Moisture is substantially completely removed from the starch granules so that the final product is usually ready for end use or packaging immediately after discharge.

The following examples will illustrate the production of starch phosphate reaction products using the process of the invention in connection with the apparatus shown in the drawings.

EXAMPLE I

Commercial grade corn starch granules were mixed with an aqueous solution of mono and disodium phosphates and the mixture was gently agitated for a sufficient period of time to allow the granules to absorb some of the solution. Thereafter, excess unabsorbed solution was removed and the granules were air dried to a moisture content below 20% by weight.

The corn starch granules containing the absorbed alkali metal phosphate salts were fed into the apparatus shown in the drawings at the rate of ¼ pound per minute. Oil at a temperature of about 176° C. was circulated through the heating tubes 28 and a continuous discharge of starch phosphate reaction product was collected at chutes 24 with the average residence time of each granule in the drum 10 being about 70 minutes.

A 5% aqueous solution of the product had a Brookfield viscosity of 50,000 centipoises.

EXAMPLE II

Example I was repeated except that the feed rate was duoble to ½ pound per minute and average residence time consequently halved. Under these conditions a starch phosphate reaction product was continuously collected having a Brookfield viscosity of 18,000 centipoises. Because of the shorter residence time, the product was also somewhat lighter in color.

It will be understood that it is intended to cover all changes and modifications of the preferred embodiments of the invention, herein chosen for the purpose of illustration, which do not constitute departures from the spirit and scope of the invention.

What is claimed is:

1. A method of continuously producing starch phosphate which comprises the steps of introducing starch granules free of excess unabsorbed water into one end of a zone of phosphorylation which is disposed lengthwise in substantially horizontal position, said starch granules containing at least one absorbed alkali metal phosphate salt and said phosphorylation zone having a plurality of heated surfaces therein spaced apart from each other and extending from said one end to the opposite end of said zone along lines substantially parallel to the length thereof, continuously moving the starch granules through said phosphorylation zone toward said opposite end thereof and simultaneously rotating said heated surfaces into, through and out of the moving starch granules, thereby causing a rolling and tumbling contact of the starch granules with said heated surfaces and rapidly raising the temperature of the starch granules to about 120° C. to about 175° C. to effect reaction thereof with said phosphate salt and collecting the starch phosphate reaction product as it discharges from said opposite end of said zone of phosphorylation.

2. The method in accordance with claim 1 which includes the step of causing a stream of air to pass through the starch in countercurrent flow to the direction of travel of the starch through the zone of phosphorylation.

3. The method in accordance with claim 1 in which the moisture content of said starch granules when introduced into the zone of phosphorylation is not in excess of about 20% by weight.

4. The method in accordance with claim 1 in which said granules are fed into the zone of phosphorylation at a rate of about ¼ to about ½ pound per minute.

5. A method of continuously producing starch phosphate in a horizontally positioned rotatable drum having a plurality of spaced heated surfaces therein which comprises the steps of continuously introducing starch granules free of excess unabsorbed water and containing at least one absorbed alkali metal phosphate salt into one end of said drum while simultaneously rotating said drum and said heated surfaces into, through and out of the moving starch granules, thereby bringing the starch granules into rolling and tumbling contact with said heated surfaces and raising the temperature of the starch granules to about 120° C. to about 175° C. to effect reaction thereof with the phosphate salt, passing air through said drum in countercurrent flow to the direction of travel of the starch therein, and collecting the starch phosphate reaction product discharged from the end of the drum opposite the one into which the starch granules are introduced.

6. The method in accordance with claim 5 in which said interior heated surfaces comprise a plurality of tubes positioned parallel to the longitudinal axis of said drum and concentrically around the interior wall thereof, with means for passing a heating medium through said tubes.

7. The method in accordance with claim 5 in which said starch granules contain absorbed mono and disodium phosphate salts.

References Cited

UNITED STATES PATENTS

| 3,060,170 | 10/1962 | Sietsema et al. | 260—233.5 |
| 2,989,425 | 6/1361 | Bierke et al. | 127—38 |
| 2,884,412 | 4/1959 | Neukom | 260—233.5 |

DONALD E. CZAJA, Primary Examiner.

R. W. MULCAHY, Assistant Examiner.